United States Patent [19]
Eckardt

[11] Patent Number: 5,223,209
[45] Date of Patent: Jun. 29, 1993

[54] METHOD FOR PRESSURE RELIEF OF THE CONTAINMENT OF A NUCLEAR POWER PLANT

[75] Inventor: Bernd Eckardt, Bruchköbel, Fed. Rep. of Germany

[73] Assignee: Siemens Aktiengesellschaft, Munich, Fed. Rep. of Germany

[21] Appl. No.: 832,734

[22] Filed: Feb. 7, 1992

[30] Foreign Application Priority Data

Feb. 7, 1991 [EP] European Pat. Off. ............ 91101714

[51] Int. Cl.$^5$ ................................................ G21C 9/004
[52] U.S. Cl. ...................................... 376/283; 376/314; 159/16.3; 55/DIG. 9
[58] Field of Search ............... 376/313, 314, 316, 283; 55/DIG. 9; 159/16.3; 210/175, 180, 184

[56] References Cited

U.S. PATENT DOCUMENTS

| | | | |
|---|---|---|---|
| 4,661,312 | 4/1987 | Schweiger | 376/313 |
| 4,863,677 | 9/1989 | Eckardt | 376/313 |
| 4,873,050 | 10/1989 | Eckardt | 376/313 |
| 5,017,331 | 5/1991 | Eckardt | 376/313 |
| 5,078,960 | 1/1992 | Berg et al. | 376/314 |
| 5,096,659 | 3/1992 | Hidaka et al. | 376/283 |

FOREIGN PATENT DOCUMENTS

| | | |
|---|---|---|
| 0285845 | 10/1988 | European Pat. Off. . |
| 0290028 | 11/1988 | European Pat. Off. . |
| 3806872 | 9/1989 | Fed. Rep. of Germany . |
| 3815850 | 11/1989 | Fed. Rep. of Germany . |
| 2055241 | 2/1981 | United Kingdom . |

*Primary Examiner*—Daniel D. Wasil
*Attorney, Agent, or Firm*—Herbert L. Lerner; Laurence A. Greenberg

[57] ABSTRACT

A method for pressure relief of a containment of a nuclear power plant includes heating a washing fluid in a filter disposed inside a containment at a rated heating power through a thermal bridge, with a gas-steam mixture filling the containment, prior to initial operation of the filter. The thermal bridge is rendered substantially ineffective in an operating state of the filter, leaving the washing fluid with a continuous rated heating power being negligible in terms of filtration. In a nuclear power plant having a containment, a system for pressure relief of the containment includes a filter being disposed inside the containment and having a container. At least part of the container has two walls defining a chamber between the walls. A heat-conducting fluid at least partly fills the chamber during a heating period and is at least half evaporated after attainment of an operating temperature.

8 Claims, 1 Drawing Sheet

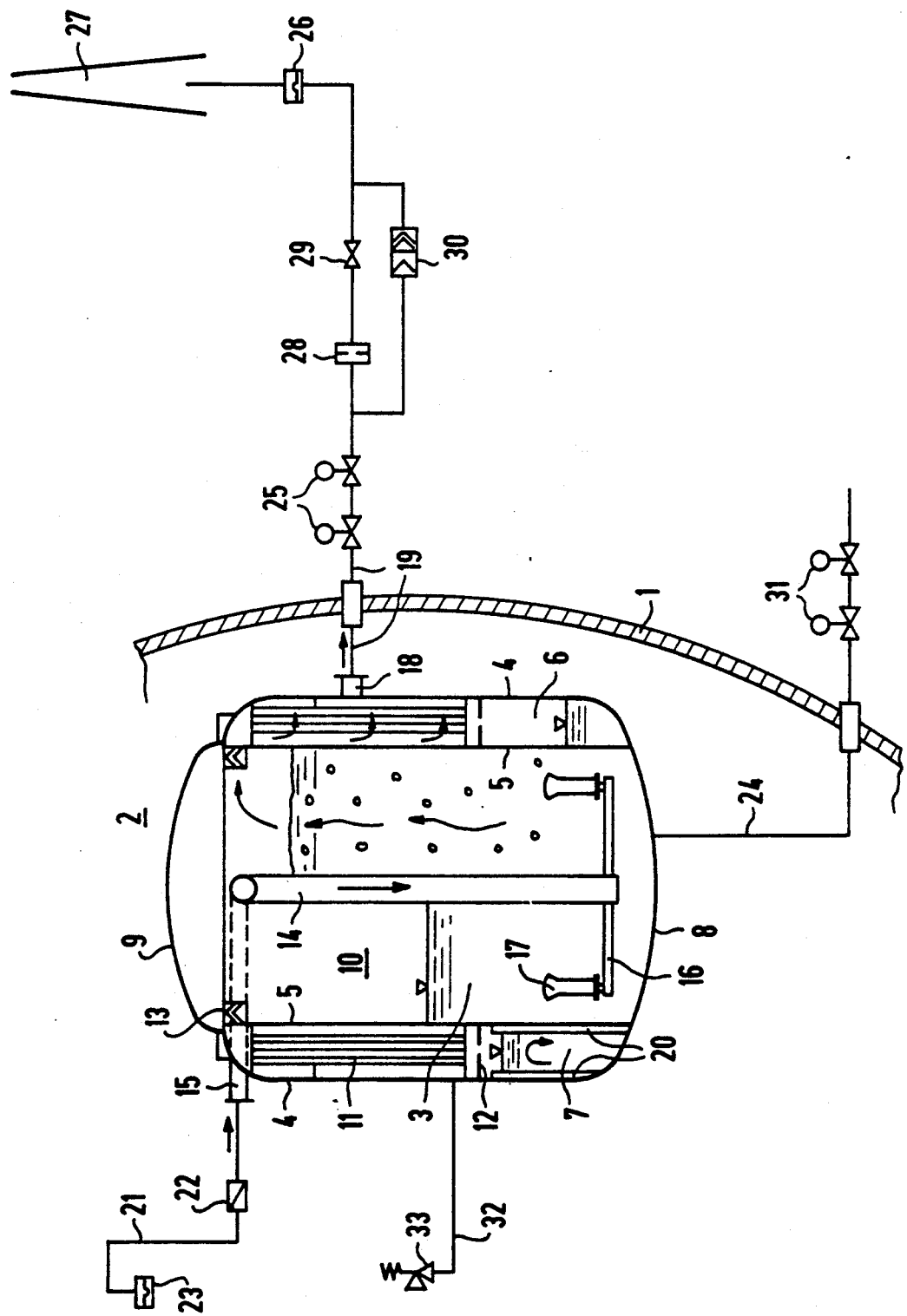

METHOD FOR PRESSURE RELIEF OF THE CONTAINMENT OF A NUCLEAR POWER PLANT

The invention relates to a method and a system for pressure relief of the containment of a nuclear power plant, having a filter disposed inside the containment which contains a washing fluid.

Pressure relief of a nuclear power plant containment may become necessary if, contrary to every expectation, the pressure threatens to exceed the design value intended for the containment. In order to reduce the pressure in the containment of a nuclear power plant, a method and an apparatus disclosed in German Published, Non-Prosecuted Application DE 38 06 872 A1 may be used, in which a wet scrubber is provided as part of a filter inside the containment. A mixture of gas and steam produced inside the containment is cleaned of toxic and/or radioactive ingredients by the scrubber before the mixture is released into the environment.

A special embodiment of a wet scrubber is described in German Published, Non-Prosecuted Application DE 38 15 850 A1. In that configuration, mixing of the gas and steam mixture with the washing fluid takes place inside Venturi nozzles, thereby assuring very intimate mixing and therefore a very good washing action.

Once the design pressure of the containment is reached, regardless of the cause of its creation, the gas-steam mixture inside the containment amounts to approximately 70% water steam, along with compressed air and other gases formed inside the containment, which also includes a not-insignificant quantity of pure hydrogen with a probability bordering on certainty.

In previously proposed embodiments having a wet scrubber accommodated inside the containment, the wet scrubber is either insulated and unheated or not insulated and accordingly continuously heated. As a result, the temperature of the washing fluid, such as water, may be markedly lower than the temperature of the gas-steam mixture, so that at least when the system is started up, upon passage of the gas-steam mixture through the washing fluid, an undesirably pronounced condensation of the water steam can occur. Even such condensation of the water steam is technically controllable only at considerable expense. However, a further disadvantage of the condensation of the water steam in the washing fluid is that as a result the relative proportion of the pure hydrogen gas in the gas-steam mixture flowing out of the wet scrubber can become undesirably high. With a continuously heated wet scrubber, there is an additional disadvantage which is that a considerable proportion of the washing fluid evaporates continuously and must be replaced.

It is accordingly an object of the invention to provide a method and a system for pressure relief of the containment of a nuclear power plant having a wet filter provided inside the containment, which overcome the hereinafore-mentioned disadvantages of the heretofore-known methods and devices of this general type, and in which at most a non-relevant proportion of the water steam contained in the filter material condenses during the startup process. Since water is preferably used as the washing fluid, the temperature of the washing fluid must be approximately equal to the temperature of the filter material. On the other hand, as little washing fluid as possible should evaporate during continuous operation.

With the foregoing and other objects in view there is provided, in accordance with the invention, a method for pressure relief of a containment of a nuclear power plant, which comprises heating a washing fluid in a filter disposed inside a containment at a relatively high rated heating power through a thermal bridge, with a gas-steam mixture filling the containment, prior to initial operation or initiation of operation of the filter; and rendering the thermal bridge substantially or virtually ineffective or even broken down completely in an operating state of the filter, leaving the washing fluid with only a remaining continuous rated heating power not being relevant for filtration.

In accordance with another mode of the invention, there is provided a method which comprises setting the continuous rated heating power at less than 0.1 times the rated heating power.

In accordance with a further mode of the invention, there is provided a method which comprises raising the washing fluid to an operating temperature after at most eight hours and preferably after substantially two hours of heating at the rated heating power.

In accordance with an added mode of the invention, there is provided a method which comprises setting an operating temperature in a range of substantially from 100° to 150° C., raising the operating temperature to as high as substantially 260° C. upon pressure relief directly from a primary loop of a nuclear power plant or direct pressure relief of a circuit that carries pressurized water, and supplying water to the filter as the washing fluid.

In accordance with an additional mode of the invention, there is provided a method which comprises supplying a quantity of heat with the continuous rated heating power being less than a quantity of heat removed or drawn from the washing fluid by evaporation, for setting an operating temperature of the filter lower than an entry temperature of the gas-steam mixture.

The method according to the invention is very advantageous, because as a result of the avoidance of concentration in the washing fluid, safe startup without significant changes of volume in the filter material is assured, and moreover a compact structure for the filter and a very small consumption of washing fluid are made possible.

With the objects of the invention in view, there is also provided, in a nuclear power plant having a containment, a system for pressure relief of the containment, comprising a filter disposed inside the containment, the filter having a container, at least part of the container being double-walled or having two walls defining a chamber between the walls, and a heat-conducting fluid at least partly filling the chamber during a heating period and being at least half evaporated after attainment of an operating temperature.

In accordance with another feature of the invention, the container has double-walled portions with the two walls, the double-walled portions having a heat-conducting resistance when not filled with the heat-conducting fluid being at least ten times higher than when filled with the heat-conducting fluid.

In accordance with a further feature of the invention, the two mutually concentric walls define a double-walled, preferably cylindrical, middle part of the container surrounding or enclosing a vertical axis, and there is provided a single-walled curved base firmly closing the middle part toward the bottom, and a curved single-walled cap firmly closing the middle part toward the top.

In accordance with an added feature of the invention, the double-walled middle part has a given height, the container includes a first inner chamber, the chamber between the walls is a second chamber having an annular cross section extending over the entire given height, and the second chamber communicates with the first inner chamber through openings formed just below the cap.

This structure of the filter container makes it possible to fill the inner chamber with washing fluid to an extent that fluctuates within wide limits, and to fill the second chamber at least in its lower part with heat-conducting fluid, which represents part of a thermal bridge between the surroundings of the filter container and the filter contents, and evaporation of the heat-conducting fluid inside the second chamber is possible. Due to the disappearance of the heat-conducting fluid from the second chamber, the thermal bridge between the surroundings of the filter container and its contents is interrupted, so that the above-mentioned advantages are attained. After the disappearance of the heat-conducting fluid from the second chamber, this chamber is available to receive radioactive waste filtered out of the gas-steam mixture, so that this waste advantageously remains inside the containment.

In accordance with an additional feature of the invention, there is provided washing fluid filling substantially 30 to 80% and preferably approximately 50% of the first inner chamber, the second chamber having a lower part being filled with the heat-conducting fluid and an upper part, and filter mats filling at least the upper part.

In accordance with again another feature of the invention, the two walls have portions surrounding the heat-conducting fluid, and at least part of the second chamber has heat transfer fins increasing surface area in the vicinity of the wall portions.

In accordance with again a further feature of the invention, both the washing fluid and the heating-conducting fluid are water.

In accordance with again an added feature of the invention, there is provided a convection barrier in the form of a horizontal partition disposed in the second chamber above the heat-conducting fluid, the horizontal partition being perforated and/or slit.

In accordance with again an additional feature of the invention, there are provided mist separators disposed in the upper part of the inner chamber in front of the openings leading to the second chamber.

In accordance with still another feature of the invention, there is provided a vertical pipe disposed centrally in the first inner chamber for delivering a gas-steam mixture to be filtered, the vertical pipe having upper and lower ends, a horizontally extending segment through which the upper end of the vertical pipe communicates with the interior of the containment, radially disposed horizontal feed pipes into which the lower end of the vertical pipe discharges, and short Venturi nozzles communicating with the horizontal feed pipes just above the base.

In accordance with still a further feature of the invention, the two walls are in the form of an inner wall and an outer wall, the outer wall has another opening formed therein leading to the outside, and there is provided a pipe penetrating the containment and communicating with the other opening for carrying a filtered gas-steam mixture out of the second chamber through the outer wall at approximately half the height of the filter mats.

In accordance with a concomitant feature of the invention, there is provided an overpressure line through which the interior of the filter communicates with a primary loop of the nuclear power plant or with the interior of the containment, the overpressure line having an overpressure valve being closed during normal operation.

Other features which are considered as characteristic for the invention are set forth in the appended claims.

Although the invention is illustrated and described herein as embodied in a method and a system for pressure relief of the containment of a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The drawing is a schematic circuit diagram of an exemplary embodiment of a system for performing the method according to the invention of pressure relief of a containment, which is shown in a fragmentary, diagrammatic, sectional view.

Referring now to the single FIGURE of the drawing in detail, there is seen a filter 2 disposed inside a containment 1 of a nuclear power plant. The filter 2 is provided for the purpose of filtering a gas-steam mixture that can be produced inside the containment 1 if a major malfunction should occur. In the event of such a malfunction, the release of considerable quantities of heat must be expected, which causes a large proportion of the water present inside the containment 1 to evaporate and causes the pressure inside the containment 1 to rise. When the calculated design pressure of the containment 1 is reached, the same gas-steam mixture is then released to the outside, while filtered by the filter 2, for pressure relief.

The filter includes a container having a cylindrical middle part including outer and inner concentric walls 4 and 5 with lower ends being joined together by a curved base 8. The walls 4 and 5 have upper ends being joined together and closed off from the outside by a likewise curved cap 9. The walls 4 and 5 form an annular chamber 6, which surrounds an inner chamber 10. The first inner chamber 10 communicates with the second annular chamber 6 through openings located immediately below the cap 9.

Inside the inner chamber 10, mist collectors 13 are secured to the upper end of the chamber 10, immediately in front of the openings in the wall 5. Filter mats 11 are disposed inside the upper half of the annular chamber 6. The filter mats 11 have a radially inner surface which communicates in a non-illustrated manner with the openings covered by the mist collectors 13 and a radially outer surface which communicates with another opening 18 leading outside, from which the filtered gas-steam mixture is carried out of the containment 1 through a pipe 19 penetrating the containment 1. The radially outer wall 4 is also pierced by an overpressure line 32, through which the annular chamber 6 is relieved through the use of an overpressure valve 33, if an impermissibly high pressure should arise.

In order to avoid convection over the entire height of the annular chamber 6, a perforated and/or slit convection barrier 12 is provided immediately below the filter mats 11.

The inner chamber 10 is filled with a washing fluid 3 to an extent of 30 to 80%, and preferably approximately half, prior to initiation of operation of the filter 2. The annular chamber 6 between the walls 4 and 5 is filled virtually completely with heat-conducting fluid 7 below the convection barrier 12. In the exemplary embodiment, water is provided as both the washing fluid 3 and the heat-conducting fluid 7.

The supply of the filter material, that is of the gas-steam mixture, into the filter 2 from the interior of the containment 1, is effected through a horizontal segment 15 that is located toward an upper end of a pipe 14 disposed vertically in the middle of the inner chamber 10. The pipe 14 has a lower end with horizontally extending feed pipes 16 disposed in a radial or star pattern, for short Venturi nozzles 17.

Normally, and particularly during nuclear power plant operation according to plan, the horizontal segment 15 is blocked off from the interior of the containment 1 through both a check valve 22 located in a line 21, and a bursting disk 23. The interior of the filter 2 also communicates with a primary loop of the nuclear power plant in a non-illustrated manner. This communication is also blocked off during normal operation. During normal operation of the nuclear power plant, the pipe 19 originating at the opening 18 leading outside is also closed. This is effected by shutoff fixtures 25, which can uncover or unblock the pipe 19 so that it is open toward not only a throttle 28 but also a further bursting disk 26 and a chimney 27. A measuring filter 30 is provided parallel to the throttle 28 and to a further shutoff fixture 29 located between the throttle 29 and the bursting disk 26.

A replenishment line 24 for washing fluid 3 communicates with the inner chamber 10 through the base 8. The replenishment line 24 penetrates the containment 1 and has a free end which is closed by shutoff fixtures 31 during normal operation.

If a major malfunction occurs inside the containment 1, then as mentioned above a considerable proportion of the water present as coolant inside the containment 1 will evaporate, causing the pressure to rise inside the containment, which is immediately hermetically sealed off in gas-tight fashion from the outside when a malfunction occurs. Parallel to the evaporation of some of the water, a number of other reactions also occur, by means of which gases and/or vapors are also produced and/or released. As a result of all of these processes, the pressure prevailing inside the containment 1 sooner or later may reach the design pressure of the containment 1. This depends substantially on the quantity of heat released.

However, the temperature inside the containment also increases simultaneously with the pressure. As a result, the entire contents of the containment, thus including the filter 2 as well, are heated. The temperature of the contents of the containment 1 already reaches 100° C. long before the calculated design pressure is approached. Since the interior of the filter 2 is sealed off hermetically from the outside and an inert gas cushion above the washing fluid is provided, the pressure inside the filter housing and the line elements connected to it rises as well, so that water provided as the heat-conducting fluid 7 and as the washing fluid 3 will not yet boil. Since heat transfer fins 20 are provided on the walls 4 and 5 in order to improve the heat transfer from the wall 4 to the heat-conducting fluid and from the fluid to the wall 5, the amount of heat given up to the heat-conducting fluid 7 by the wall 4 is especially high, so that a containment vessel temperature of 150° C., for example, is quickly reached.

Accordingly, when the bursting disk 23 responds, the temperature of the washing fluid 3 is 150° C., for example, which is the temperature that has been reached by then inside the containment 1. Thus the gas-steam mixture flowing through the line 21, the horizontal segment 15 and the pipe 14 and through the feed pipes 16 to the short Venturi nozzle 17, will be only insignificantly if at all warmer, than the washing fluid 3. Accordingly, when the gas-steam mixture mixes with the washing fluid 3 in the short Venturi nozzles 17, only an insignificant portion of the water steam will condense out of the gas-steam mixture, so that the gas-steam mixture emerging upward from the washing fluid 3 and also flowing out through the mist collectors or separators 13 and the filter mats 11 to the opening 18 leading to the outside substantially has the same composition as the mixture carried into the filter through the line 21.

The gas-team mixture flowing into the filter 2 through the short Venturi nozzles 17 undergoes a pressure drop from 2000 to 200 hPa in this process, so that immediately after the response of the bursting disk 23, washing fluid 3 and heat-conducting fluid 7 evaporate. Since in contrast to the washing fluid, the heat-conducting fluid is not replenished, it is soon evaporated, and as a result the thermal bridge between the interior of the containment 1 and the interior of the filter 2 is broken. Due to the removal of the heat of evaporation, the temperature of the washing fluid 3 is approximately 10° to 2° lower than the temperature of the inflowing gas-steam mixture.

After the response of the bursting disk 23, the pressure, which is lowered merely by the aforementioned amount, prevails in the filter 2. This pressure is almost equivalent to the pressure in the interior of the containment 1, so that only a relatively small volumetric flow of gas-steam mixture has to be filtered. Moreover, because of the accommodation of filter mats 11 in the chamber 6 annularly surrounding the inner chamber 10, a very compact, space-saving structure for the filter 2 is made possible.

When the filter 2 is in operation for a relatively long period, filter material dripping out of the filter mats 11 will collect in the lower part of the chamber 6 and as a result will re-create a thermal bridge to the washing fluid 3. Nevertheless, this process proceeds so slowly that it presents no threat or substantial impairment to the filtration. In any case, during continuous operation of the filter, only relatively small losses of washing fluid need be expected, because only the quantity of heat contained in the filter material itself flows through the filter 2. However, as long as the partial pressure of the water steam in the gas-steam mixture is lower than the boiling pressure corresponding to the temperature of the washing fluid, some of the washing fluid will evaporate. As a result, heat is removed from the washing fluid, and in other words the temperature is lowered, until the boiling pressure is equal to the partial pressure.

I claim:

1. A method for pressure relief of a containment of a nuclear power plant, which comprises:

heating a washing fluid in a filter disposed inside a containment at a rated heating power through a thermal bridge, with a gas-steam mixture filling the containment, prior to initial operation of the filter; and rendering the thermal bridge substantially ineffective in an operating state of the filter, leaving the washing fluid with a continuous rated heating power being negligible in terms of filtration.

2. The method according to claim 1, which comprises setting the continuous rated heating power at less than 0.1 times the rated heating power.

3. The method according to claim 1, which comprises raising the washing fluid to an operating temperature after at most eight hours of heating at the rated heating power.

4. The method according to claim 1, which comprises raising the washing fluid to an operating temperature after substantially two hours of heating at the rated heating power.

5. The method according to claim 1, which comprises setting an operating temperature in a range of substantially from 100° to 150° C., raising the operating temperature to substantially 260° C. upon pressure relief directly from a primary loop of a nuclear power plant, and supplying water to the filter as the washing fluid.

6. The method according to claim 1, which comprises supplying an amount of heat with the continuous rated heating power being less than an amount of heat removed from the washing fluid by evaporation, for setting an operating temperature of the filter lower than an entry temperature of the gas-steam mixture.

7. A method for pressure relief of a containment of a nuclear power plant, which comprises:

sealing a filter disposed inside a containment against a gas-steam mixture filling the containment, prior to initial operation of the filter;

heating a washing fluid in the filter through a thermal bridge with the gas-steam mixture at a given heating power, prior to the initial operation of the filter;

allowing the gas-steam mixture to flow into the washing fluid for filtering therewith, in an operating state of the filter; and rendering the thermal bridge substantially ineffective in the operating state of the filter by reducing a heat transfer through the thermal bridge to the washing fluid, setting a continuous heating power being negligible in terms of filtration by the washing fluid.

8. The method according to claim 7, which comprises setting the continuous heating power at less than 0.1 times the given heating power.

* * * * *